ions Patented Feb. 3, 1970

3,493,559
2-THIOCYTOSINE RIBOFURANOSIDES

James H. Hunter, Kalamazoo, Mich., assignor to The Upjohn Company, Kalamazoo, Mich., a corporation of Delaware
No Drawing. Filed May 29, 1967, Ser. No. 642,131
Int. Cl. C07d 51/32, 99/04; A61k 27/00
U.S. Cl. 260—211.5     6 Claims

ABSTRACT OF THE DISCLOSURE

Certain new 2-thiocytosine ribofuranosides, active against viruses, have been prepared by blocking the OH groups of the sugar of a 2-thiouracil ribofuranoside with an acylating agent, reacting the "blocked" 2-thiouracil ribofuranoside with phosphorus pentasulfide so as to replace the 4-oxygen with a sulfur atom, and then reacting the "blocked" 2,4-dithiouracil ribofuranoside thus produced with a basic nitrogenous compound having a replaceable N-hydrogen to produce the desired 2-thiocytosine ribofuranoside. The 5-position of the cytosine group can be alkyl substituted.

SUMMARY OF THE INVENTION

This invention pertains to new organic chemical compounds, and to a new process for preparing them. The invention is more particularly directed to new 2-thiocytosine ribofuranosides, and to the process comprising acylating the sugar OH groups of a 2-thiouracil ribofuranoside, reacting the "blocked" 2-thiouracil ribofuranoside with phosphorus pentasulfide, and reacting the "blocked" 2,4-dithiouracil ribofuranoside thus produced with a basic nitrogenous compound having a replaceable N-hydrogen to produce 2-thiocytosine ribofuranoside.

The new 2-thiocytosine ribofuranosides of this invention have in their free base form the following structural formula

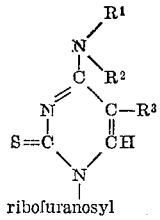

ribofuranosyl     I wherein $R^3$ is hydrogen or lower-alkyl of from 1 to 4 carbon atoms, inclusive, and wherein the

is the amino group of a nitrogenous base having:

(1) $R^1$ and $R^2$ singly selected from the group consisting of hydrogen; lower-alkyl; cycloalkyl; oxa- and C-azamonoheterocyclic groups; oxa- and C-azamonoheterocyclic-lower-alkyl groups; aryl; and aralkyl; and (2) $R^1$ and $R^2$ selected as a unit with the $-N<$ atom thus forming a saturated heterocyclic amino group

of from 3 to 7 ring members, inclusive, the $R^1$–$R^2$ unite Z having a total of no more than 10 carbon atoms, one ring member of which is selected from carbon, nitrogen, or oxygen, so that Z is alkylene, oxadialkylene, or azadialkylene.

DETAILED DESCRIPTION

Representative amino groups,

include those wherein $R^1$ and $R^2$ are singly selected from hydrogen; alkyl containing from 1 to 8 carbon atoms, inclusive, for example, methyl, ethyl, propyl, butyl, pentyl, hexyl, octyl, and isomeric forms thereof; aralkyl containing from 7 to 13 carbon atoms, inclusive, for example, benzyl, α- and β-phenethyl, benzhydryl and the like; aryl containing from 6 to 10 carbon atoms, inclusive, for example, phenyl, o-, m-, and p-tolyl, α- and β-naphthyl, and the like; cycloalkyl containing from 4 to 8 carbon atoms, for example, cyclobutyl, cyclopentyl, cyclohexyl, methylcycloheptyl, and the like; oxa- and C-azamonoheterocyclic radicals, for example, furyl, pyrrolyl, and the like; oxa- and C-azamonoheterocyclic-lower-alkyl radicals, for example, furfuryl, β,β-dimethyl-β-(2-furyl)ethyl, and the like; and $R^1$ and $R^2$ selected as a unit with the $-N<$ atom is a saturated heterocyclic amino group

of from 3 to 7 members, inclusive, the $R^1$–$R^2$ unit Z having a total of no more than 10 carbon atoms, one ring member of which is selected from carbon, nitrogen, or oxygen, the other ring members being carbon so that Z is alkylene, oxadialkylene, or azadialkylene.

The new 2-thiocytosine ribofuranosides of this invention form stable acid addition salts. Hence, the stable acid addition salts are contemplated as an embodiment of the invention. The acid addition salts are readily prepared, and are a convenient form of the new compounds for many purposes.

Illustratively, acid addition salts are prepared in order to obtain the compounds in pure form. The pure free base compounds being obtained by neutralizing the acid with a base and recovering the amine free base according to conventional methods. Likewise, the acid addition salts of the invention are a convenient means of obtaining the compounds in crystalline form, and for minimizing oxidative decomposition of the free bases.

Acid addition salts are also a convenient form of the compounds of the invention for assuring solubility in aqueous media. This quality of the acid addition salts is particularly important in treating animals and plants. All acid addition salts are so useful, as long as the acid anion does not interfere with the desired effect of the amine free base.

The hydrochloride acid addition salt is representative, readily preparable, and preferred. The hydrochloride is obtained by using hydrochloric acid or anhydrous hydrogen chloride. Other representative mineral acid addition salts are the hydrobromides, the hydroiodides, the sulfates, the phosphates, the nitrates, the arsenates, and the fluosilicates salts. Representative organic acid addition salts are the acetates, the propionates, the benzoates, the salicylates, the glycolates, the succinates, the nicotinates, the tartrates, the maleates, the malates, the oxalates, the pamoates, the methylsulfonates, the picrates, the aronates, arsanilates, and the lactates.

The fluosilicate acid addition salts of the 2-thiocytosine ribofuranosides of this invention are useful as mothproofing agents in accordance with U.S. Patents 1,915,334 and 2,075,359. The thiocyanate acid addition salts are useful for condensing with formaldehyde in accordance with U.S. Patents 2,425,320 and 2,606,155 to form amine thiocyanate-formaldehyde condensation products for use as pickling inhibitors.

The new 2-thiocytosine ribofuranosides of Formula I and acid addition salts are active against viruses, and can be used to kill viruses and inhibit viral propagation. In particular, the compound 1-β-D-ribofuranosyl-2-thiocytosine has been found to be active against the respiratory syncytial virus and a rhinovirus. The compound can be used to combat these and other viruses. Advantageously, the compounds of the invention can be used against plant viruses, for example, tobacco mosiac virus, by applying the compounds directly on plants or by injecting the compounds into the vascular system of plants, for example, by spraying with a 0.1% to 5% solution of the hydrochloric acid addition salt.

The valuable anti-viral activity of the new 2-thiocytosine ribofuranosides and their acid addition salts is utilized by contacting the compounds with the virus to be controlled. The desired contact is accomplished by infusing them by well-known methods into the millieu containing the virus. Hence, for example, a respiratory syncytial virus infection of chimpanzees can be controlled by applying a 2-thiocytosine ribofuranoside or acid addition salt to the mucus membranes of the nose and throat. The compound thus applied to an infected or proximate tissue becomes dispersed throughout the tissue fluids and thus contacts the virus at the site of infection. The desired contact can also be accomplished systematically by formulating the compounds or their salts in compositions for oral or parenteral administration.

For oral administration the 2-thiocytosine ribofuranosides and their acid addition salts can be formulated with a pharmaceutical carrier to give solid or fluid unit dosage forms.

Suitable solid forms include tablets, pills, capsules, granules, powders, suppositories, and the like. Advantageously, the pharmaceutical carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil, and peanut oil.

For parenteral administration, 2-thiocytosine ribofuranosides and their acid addition salts can be formulated in dilute aqueous solutions, aqueous suspensions, and oil dispersions for intramuscular injection, intravenous drip, vascular perfusion, or like routes. Advantageously, a solubilizer, for example, N,N-dimethylacetamide (preferred), N,N-dimethylformamide, ethanol, and the like can be utilized. If desired, other aqueous media such as water for injection, normal saline solution, Ringer's solution, blood plasma, and whole blood can be used.

Compositions of 2-thiocytosine ribofuranosides and their acid additions salts for topical applications include powders (preferred), ointments, creams, pastes, jellies, and the like. Such compositions of the essential active ingredient can include emulsifying agents, solvents, antioxidants, preservatives, buffers, and bodying materials.

The dosage of 2-thiocytosine ribofuranosides and their acid addition salts depends upon the route of administration, the circumstances of treatment (e.g., severity of disease and length of treatment), as well as an infected animal's age, weight, and general physical condition. In general, a total daily dosage of from 0.1 to 50 mg./kg. is effective. Single daily, divided daily, or intermittent schedules can be employed. For topical applications, formulations containing 0.5 to 25% of the active material, and preferably 2–5%, can be used. Higher concentrations than 25% can be used for some local applications.

The new 2-thiocytosine ribofuranosides of this invention are conveniently prepared by the thiation-amination procedure described in U.S. Patent No. 3,116,282. In general, a selected 2-thiouracil ribofuranoside is reacted with an acylating agent, e.g., acetic anhydride, acetyl chloride, benzoyl chloride, and the like in order to block the OH groups of the sugar. The fully acylated or "blocked" 2-thiouracil is then reacted with phosphorus pentasulfide so as to replace the 4-oxygen with a sulfur atom. The thus-produced 2,4-dithiouracil "blocked" ribofuranoside is then reacted with a basic nitrogenous compound having a replaceable N-hydrogen to produce the desired 2-thiocytosine ribofuranoside. Deacylation is conveniently accomplished during the animation.

Some of the starting 2-thiouracil ribofuranosides are known. For example, 1-β-D-ribofuranosyl-2-thiouracil and 1-β-D-ribofuranosyl-5-methyl-2-thiouracil are known. Other 2-thiouracil ribofuranosides can be prepared according to the methods described by Brown, Parihar, Todd, and Varadarajan, J. Chem. Soc. (1958) p. 3028, by Shaw and Warrener, Proc. Chem. Soc. (1957) p. 351, and by Naito, Karwakami, Sano, and Hirata, Chem. Pharm. Bull, Japan 9, p. 249 (1961).

The following examples are illustrative of the process and products of the present invention, but are not to be construed as limiting.

EXAMPLE 1.—PREPARATION OF 1-β-D-RIBOFURANOSYL-2-THIOCYTOSINE HYDROCHLORIDE

Part A.—1-(2,3,5-tri-O-acetyl-β-D-ribofuranosyl)-2-thiouracil

A suspension of 390 mg. (1.5 millimoles) of finely powdered 2-thiouridine prepared as described by Brown, Parihar, Todd, and Varadarajan, supra, in 6 ml. acetic anhydride containing 3 drops pyridine was warmed in a bath at 74° to 75° C. After 48 hours, the 2-thiouridine had dissolved and the solution was cooled. The cooled solution was diluted with 6 ml. methanol by adding the methanol in small portions with occasional swirling and cooling during 20 minutes. The diluted methanolic solution was then warmed to about 50° to 60° C. under reduced pressure in order to remove the volatile component. The thick gum that was obtained was dissolved in warm benzene, and the solvent was again removed by evaporation under reduced pressure. A foam that remained was dissolved in hot absolute ethanol, and the solvent was again removed by evaporation under reduced pressure. The white foam thus obtained was held under reduced pressure for an additional 16 hrs. It was essentially pure (581.6 mg., 100.2% yield 1 - (2,3,5-tri-O-acetyl-β-H-ribofuranosyl) - 2 - thiouracil according to thin layer chromatographic evaluation (the adsorbent was silica gel with phosphor, and the solvent system was ethyl acetate: technical hexane (Skellysolve B): methanol (8:12:1)).

$\lambda_{min.}^{95\% \ EtOH}$

243–244 mμ (ε 4,400), $\lambda_{max.}^{95\% \ EtOH}$ 275 mμ (ε 14,400).

Part B.—1-(2,3,5-tri-O-acetyl-β-D-ribofuranosyl)-2,4-dithiouracil

A suspension consisting of 541.2 mg. (1.4 millimoles) 1-(2,3,5-tri-O-acetyl-β-D-ribofuranosyl)-2-thiouracil (Part A, above), 342 mg. (1.54 millimoles) phosphorus pentasulfide, in 7.5 ml. pyridine was heated at the reflux temperature for 4 hrs. (moisture was excluded from the reaction mixture). After chilling the reaction mixture, the dark supernatant solution was separated and poured into a mixture of crushed ice and water. A tarry substance that separated was extracted two times with pyridine The pyridine extracts were added to the ice water. A yellow precipitate began to form in the ice-water mixture and the mixture was refrigerated at 5° C. overnight. The yellow precipitate was collected on a filter, washed with water, and dried. The filtrate and the water washes were combined and extracted 4 times with chloroform. The extracts were combined and the filter cake of yellow precipitate was dissolved therein. The resulting solution was washed 4 times with cold water, 3 times with cold, 3 N sulfuric acid, 3 times with cold, saturated aqueous sodium bicarbonate, and 3 times with ice-water. A bright yellow chloroform solution resulted. The solution was dried over anhydrous sodium sulfate. After removing the chloroform by evaporation under reduced pressure, the amorphous residue thus obtained was held at about 25° C. and reduced pressure for 15 hrs. The solid thus obtained was mixed with hot methanol, and a small amount of insoluble material was collected on a filter and washed with hot methanol. The methanolic washes were combined with the filtrate, and the methanol was removed by evaporation under reduced pressure. A yellow foam that resulted was held under high vacuum for 1 hr. at a bath temperature of 45° C. to give 503 mg. (90% yield) of crude 1-(2,3,5-tri-O-acetyl-β-D-ribofuranosyl)-2,4-dithiouracil.

$\lambda_{min.}^{95\% \text{ EtOH}}$

238–241 mμ (ε 2,140), $\lambda_{max.}^{95\% \text{ EtOH}}$ 280 mμ (ε 22,070).

Part C.—1-β-D-ribofuranosyl-2-thiocytosine hydrochloride

A quantity (410 mg., 1.02 millimoles) of 1-(2,3,5-tri-O-acetyl - β-D-ribofuranosyl) - 2,4-dithiouracil (Part B, above) was charged into a glass reaction vessel and 25 ml. absolute methanol that had been previously saturated with dry ammonia at 0° C. was added. The charged glass vessel was sealed in a steel jacket and heated at about 105° C. for about 40 hrs. After cooling the reaction vessel and contents, and venting, the dark, orange-red solution was poured through a plug of cotton. The glass vessel was rinsed with portions of methanol and the rinsings were poured through the cotton plug. The thus combined filtrate and rinses were held at reduced pressure in order to remove most of the methanol and ammonia. Any remaining methanol and ammonia along with most of the acetamide that had been formed were removed by heating the mixture in a bath at 75° C. under reduced pressure. The gum thus obtained was dissolved in methanol and treated with decolorizing charcoal. The charcoal was removed by filtration, and the filter was washed with warm methanol. The pale yellow filtrate and the methanol washes were combined (volume about 40 ml.), and ether was added until the solution was faintly turbid. An excess of anhydrous hydrogen chloride was then slowly introduced. The solution became quite cloudy and then cleared. Further addition of ether caused pronounced turbidity and the solution was seeded and the wall of the flask was scratched. Crystallization occurred rapidly. The crystallizing mixture was held at 25° C. for 2 hrs. and at −16° C. for 2 hrs. The crystals (140.1 mg.) were collected on a filter, washed with anhydrous ether, and dried. A portion (136.7 mg.) of the crystals thus obtained was dissolved in hot methanol and the methanolic solution was treated with decolorizing charcoal. The suspension was filtered to remove the charcoal, and the filter was washed with hot methanol. The pale yellow filtrate and washes were combined (about 8 ml. volume) and diluted with 15 ml. anhydrous ether. Crystallization occurred spontaneously, and after remaining at about 25° C. for 1.5 hours the crystallizing mixture was refrigerated at 5° C. for 2 days. The crystals were collected on a filter, washed with anhydrous ether, and dried to give 109.5 gm. of 1-β-D-ribofuranosyl-2-thiocytosine hydrochloride that had no definite melting point.

*Analysis.*—Calcd. for $C_9H_{14}ClN_3O_4S$: C, 36.55; H, 4.77; Cl, 11.99; N, 14.21; S, 10.84. Found: C, 36.89; H, 5.02; Cl, 11.80; N, 14.21; S, 10.55.

Optical rotation: $[\alpha]_D^{23°}+61°$ (C, 0.801 in water).
Ultraviolet absorption:

$\lambda_{max.}^{0.1 \text{ N HCl}}$

229; 276; 310$_{sh.}$ mμ (ε 17,400; 18,000; 5,700)

$\lambda_{max.}^{H_2O}$

248; 270$_{sh.}$ mμ (ε 21,850; 17,550)

$\lambda_{max.}^{0.1 \text{ N NaOH}}$

249; 270$_{sh.}$ mμ (ε 22,500; 18,100)

Characteristic infrared absorption frequencies (cm.$^{-1}$):

OH/NH—3410, 3360, 3270, 3190, 3100, 3060
C=C/C=N—1680, 1645, 1580
NH deformat./—N—C=S—1530 (strong)
C=S—1280, 1260
C—O/C—N—1185, 1130, 1100, 1050

EXAMPLE 2

Following the same procedure as Example 1, Parts A, B, and C, but substituting 1-β-D-ribofuranosyl - 5-methyl-2-thiouracil for 2-thiouridine there were prepared 1-(2,3,5-tri-O-acetyl - β-D-ribofuranosyl) - 5-methyl-2-thiouracil, 1-(2,3,5-tri-O-acetyl-β-D-ribofuranosyl) - 2,4-dithio-5-methyluracil, and 1-β-D-ribofuranosyl-5-methyl - 2 - thiocytosine, respectively.

EXAMPLE 3

Following the procedure of Example 1 (Part C) but substituting ethylamine, butylamine, isobutylamine, amylamine, octylamine, dimethylamine, diethylamine, dipropylamine, diamylamine, diheptylamine, cyclohexylamine, N-methylcyclopentylamine, benzylamine, furfurylamine, 2-aminopyrrole, ethyleneimine, piperidine, morpholine, aniline, phenethylamine and 2-methylpyrrolidine for ammonia there were prepared the corresponding 1-β-D-ribofuranosyl - 2-thiocytosines having N-substitutents N-ethyl, N-butyl, N-isobutyl, N-amyl, N-octyl, N,N-dimethyl, N,N-diethyl, N,N-dipropyl, N,N-diamyl, N,N-diheptyl, N-cyclohexyl, N-methyl-N-cyclopentyl, N-benzyl, N-furfuryl, N-(2-pyrrolyl), N,N-ethylene, N,N-pentamethylene, N,N-(3-oxapentamethylene), N-phenyl, N-phenethyl, and N,N-(1-methyltetramethylene), respectively.

I claim:
1. 2-thiocytosine ribofuranoside of the formula

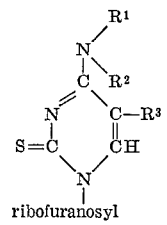

and acid addition salts thereof, wherein $R^3$ is hydrogen or lower-alkyl of from 1 to 4 carbon atoms, inclusive, and wherein

is the amino group of a nitrogenous base having:
(1) $R^1$ and $R^2$ singly selected from the group consisting of hydrogen; lower-alkyl; cyclo-alkyl; oxa- and C-azamonoheterocyclic groups of 5 ring members; oxa- and C-azamonoheterocyclic-lower-alkyl of 5 ring members, aryl of from 6 to 10 carbon atoms; and aralkyl of from 7 to 13 carbon atoms;

(2) $R^1$ and $R^2$ selected as a unit with the

atom thus forming a saturated heterocyclic amino group

of from 3 to 7 ring members, inclusive—the $R^1$–$R^2$ unit Z having a total of no more than 10 carbon atoms, one ring member of which is selected from carbon, nitrogen, or oxygen, so that Z is alkylene, oxadialkylene, or azadialkylene.

2. 2-thiocytosine ribofuranoside acid addition salt according to claim 1.

3. 2-thiocytosine ribofuranoside hydrochloride according to claim 2.

4. 1-β-D-ribofuranosyl - 2 - thiocytosine hydrochloride according to claim 3.

5. Fully acylated 1-β-D-ribofuranosyl-2-thiouracil of the formula

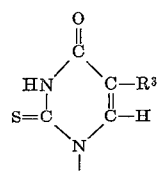

ribofuranosyl
(fully acylated)

wherein $R^3$ is hydrogen or lower-alkyl of from 1 to 4 carbon atoms, inclusive and wherein the acyl groups are acetyl and benzoyl.

6. 1-(2,3,5-tri-O-acetyl-β-D - ribofuranosyl) - 2 - thiouracil according to claim 5.

References Cited

UNITED STATES PATENTS

| | | | |
|---|---|---|---|
| 3,116,282 | 12/1963 | Hunter | 260—211.5 |
| 3,282,921 | 11/1966 | Verheyden et al. | 260—211.5 |

LEWIS GOTTS, Primary Examiner

JOHNNIE R. BROWN, Assistant Examiner

U.S. Cl. X.R.

424—180